US008437783B2

(12) United States Patent
Gustafsson

(10) Patent No.: US 8,437,783 B2
(45) Date of Patent: May 7, 2013

(54) METHOD AND APPARATUS FOR MOBILE SUBSCRIBER ALERT NOTIFICATION

(75) Inventor: Stefan Gustafsson, Karlskrona (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 377 days.

(21) Appl. No.: 12/520,730

(22) PCT Filed: Dec. 20, 2007

(86) PCT No.: PCT/SE2007/051062
§ 371 (c)(1),
(2), (4) Date: Dec. 22, 2009

(87) PCT Pub. No.: WO2008/079092
PCT Pub. Date: Jul. 3, 2008

(65) Prior Publication Data
US 2010/0093380 A1 Apr. 15, 2010

(30) Foreign Application Priority Data
Dec. 22, 2006 (SE) ...................................... 0602819

(51) Int. Cl.
H04W 4/12 (2009.01)
(52) U.S. Cl.
USPC ...................... 455/466; 455/456.1; 455/456.5; 455/414.1; 370/328; 342/357.31
(58) Field of Classification Search ............... 455/456.1, 455/456.2, 456.3, 456.5, 404.1, 404.2, 414.2, 455/466, 445; 342/357.31, 354; 340/539.1, 340/426.16, 994, 998, 8.1; 370/328, 522; 379/70, 214.01
See application file for complete search history.

(56) References Cited

U.S. PATENT DOCUMENTS

| | | | | |
|---|---|---|---|---|
| 6,119,012 A * | 9/2000 | Amirijoo | .................... | 455/456.1 |
| 7,013,149 B2 * | 3/2006 | Vetro et al. | .................. | 455/456.1 |
| 7,801,533 B2 * | 9/2010 | Maanoja et al. | ............ | 455/456.1 |
| 2002/0118118 A1 * | 8/2002 | Myllymaki et al. | ........ | 340/686.1 |
| 2002/0183074 A1 * | 12/2002 | Delaveau et al. | ............. | 455/456 |
| 2004/0198397 A1 | 10/2004 | Weiss et al. | | |
| 2006/0253492 A1 * | 11/2006 | Omansky et al. | .......... | 707/104.1 |

FOREIGN PATENT DOCUMENTS

| | | |
|---|---|---|
| WO | WO 98/08350 A | 2/1998 |
| WO | WO 03/045101 A | 5/2003 |
| WO | WO 2006/125652 A2 | 11/2006 |
| WO | WO 2006/125852 A | 11/2006 |

* cited by examiner

Primary Examiner — Mahendra Patel

(57) ABSTRACT

A Location Server receives requests for subscribers that are within an Alert Area to enable notifications/alerts to be sent to the subscribers from an Alert Application. The Location Server extracts the location information by performing a search in a Database for subscribers that are located in the Alert Area. The quality of the locations in the database is dependent of the frequency with which a Core Network sends passive location data to the Location Server at network events when the Mobile Station is in contact with the network. The Location Server reconfigures the Core Network and Radio Access Network to send the information when it is needed. An advantage of the invention is that it is possible to provide services that require knowing which subscribers are currently located in a specific area in a flexible way without over loading the mobile network.

22 Claims, 10 Drawing Sheets

METHOD AND APPARATUS FOR MOBILE SUBSCRIBER ALERT NOTIFICATION

FIELD OF INVENTION

The present invention relates to subscriber notifications and more particularly to a method and apparatus for mobile subscriber alert notifications.

BACKGROUND

There exists various occasions when there is a need to alert and/or notify individuals. In some situations it is also preferred to be able to notify only individuals being present in a specified geographical area. The alert can be a warning for a bush fire, traffic guidance, advertisement etc. but can also be useful for geo-fencing and territorial monitoring.

Mobile communication systems and the mobile terminals is one example of a system that can be used for such notifications.

In the Global Systems for Mobile communication (GSM) standard, there is a service defined called Short Message Service (SMS) Cell Broadcast, which provides an information supplier with the possibility of broadcasting a message to the GSM users within a certain geographical region, see GSM Technical Specification (TS) 03.02. The geographical region in which a SMS Cell Broadcast message is broadcast is defined on a per message basis and can include one or more cells, or even an entire Public Land Mobile Network (PLMN). An SMS Cell Broadcast message is broadcast cyclically by the Base Transceiver Stations (BTSs) in the defined geographical region at a frequency and duration specified by the information supplier.

Cell broadcast can be used to inform all subscribers connected to a cell of a specific mobile operator via Short Message Service SMS about something important in the particular location.

A drawbacks with the cell broadcast solution is that accuracy is limited to cell accuracy. Further, the same information is broadcasted to all subscribers. It is also a drawback that a mobile network does not know who are in the particular location, for example temporary out of coverage, so it is not possible to follow up if the subscriber got the notification. Cell broadcast also has several limitations in terms of functionality.

The applicants patent application WO 98/08350 describes a method and system for selectively broadcasting a message to mobile stations traveling within a particular geographic area within a serving mobile switching center (MSC) coverage area. The message is transmitted using for example short message service (SMS) messages to each of the mobile stations determined to be located within the specified geographic area. The determination of to which mobile stations to send the message is done by querying a visiting location register (VLR).

A drawback with WO 98/08350 is that the accuracy, e.g. the age, of the information accessible in the VLR is not sufficient.

WO 00/54524 describes a service by which suppliers of general information can supply general information to the mobile radio network users in a certain geographical area, without the users having to set their mobile stations in the mode for receiving such information.

The service comprises registering a general information message in a general information message register in the mobile radio network including registering an identification of served area. When receiving a location update message from the mobile station the identification of served area is comparing with the information of the location of said mobile station included in the location update message. It is determined whether the general information message should be sent to the mobile station based on the result of the comparison and the general information message is sent to the mobile station if it is determined that the general information message should be sent.

A problem with the invention according to WO 00/54524 is that it is the mobile station that initiates the sending of information. Thus, although the subscriber location in the mobile network is known by the location update information the method is not suitable for alert notifications where it is important to be able to distribute the information urgently to a plurality of mobile stations since awaiting the mobiles updating their location is not acceptable.

SUMMARY OF INVENTION

Earlier technology suffers from presenting solutions for efficiently finding which mobile stations are located in a specific geographical area such that alert notifications can be adequately communicated to a plurality of subscribers within the area. The present invention relates to the problem of providing an improved apparatus and method for mobile subscriber alert notification whereas the above mentioned drawbacks are avoided.

This problem is solved by a method and apparatus for mobile subscriber alert notification. A location server receives a request for subscribers within an alert area from an alert application and receives subscriber locations from at least one network node. The location server stores received subscriber locations in a location database and checks received and/or stored subscriber location data for subscribers located within the alert area. If so the location server informs the alert application about such subscribers.

An advantage of the invention is that it is possible to provide services that require knowing which subscribers are currently located in a specific area in a flexible way without over loading the mobile network.

The purpose with the invention is to provide a method and apparatus for efficiently finding which mobile stations are located in a specific geographical area for mobile subscriber alert notification.

Preferred embodiments of the invention will now be described in more detail with reference to the enclosed drawings.

BRIEF DESCRIPTION OF THE DRAWINGS

FIG. 4b is a flow chart showing the method of the Location Server in FIG. 4a.

FIG. 5b is a flow chart showing the method of the Location Server if FIG. 5a.

DETAILED DESCRIPTION OF THE INVENTION

Figure 1:
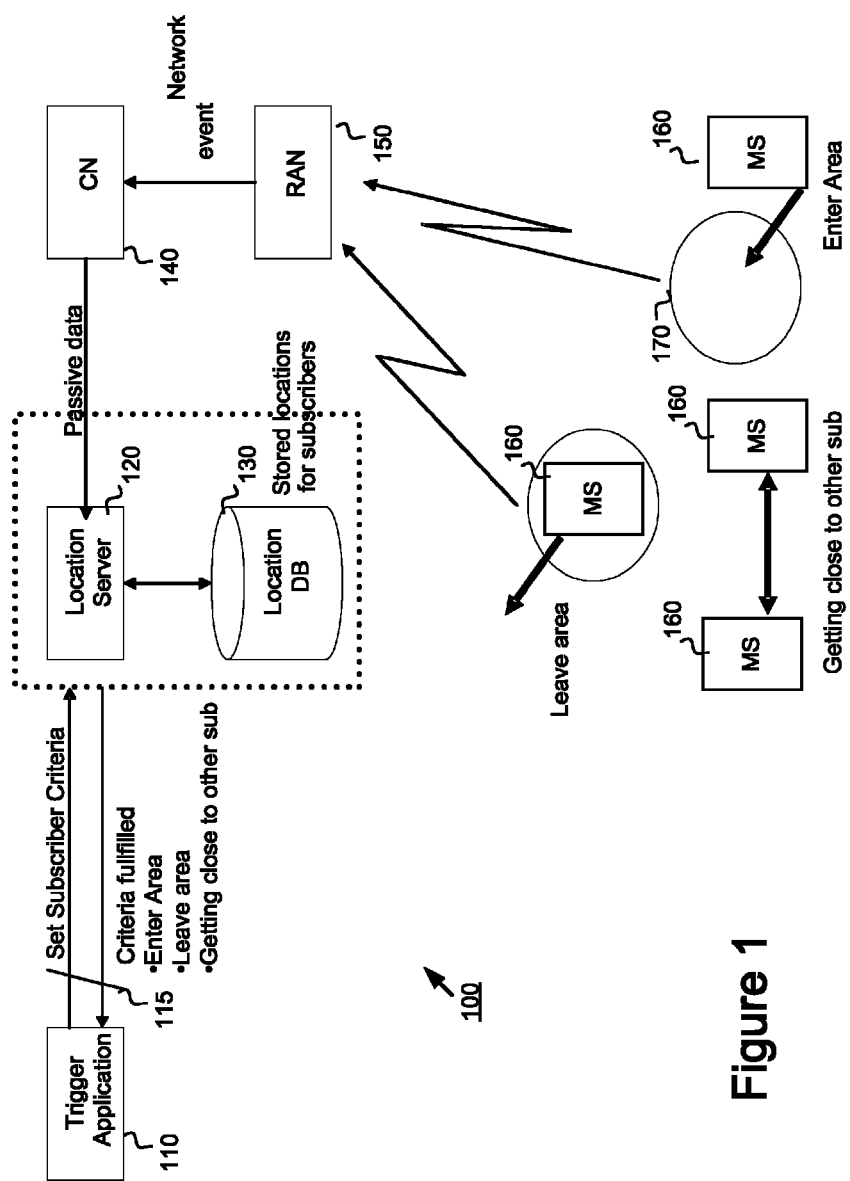
FIG. 1 is a block diagram showing an architecture overview of a spatial trigger system according to the prior art.

FIG. 1 is a block diagram showing an architecture overview of a spatial trigger system according to the prior art.

The services that spatial triggers enable are services that are dependent on how a subscriber moves. A couple of examples are:
Inform a service when a subscriber enters an area
Inform a service when a subscriber leaves an area
Inform a service when two subscribers are getting close to each other.

Location based/trigger applications 110 request a Location Server 120 (Location Server LS terminology according to OMA and Gateway Mobile Location Centre GMLC is the term used by 3GPP) to get informed when a specific subscriber enters/leaves an area or getting close to another specific subscriber.

The OMA standardized Mobile Location Protocol MLP is used as application interface 115 between the trigger applications 110 and the Location Server 120.

The Location Server is responsible for updating a Location Database DB 130, which can be stand alone or co-located with the LS, with subscriber locations received from other nodes in the mobile network. The Location Server is also responsible for checking the different criterion and inform the trigger application when a criteria is fulfilled. The quality of the locations in the DB 130 is dependent of the update frequency of the subscriber locations.

A Core Network CN 140 sends passive data to the Location Server when the Mobile Station MS 160 is in contact with the mobile net 100 via cells 170 managed by the Radio Access Network RAN 170. Examples of this are network events such as when subscriber sending SMS, making a call, location area update and periodic location update. The passive data include MS identity and location information.

Figure 2:
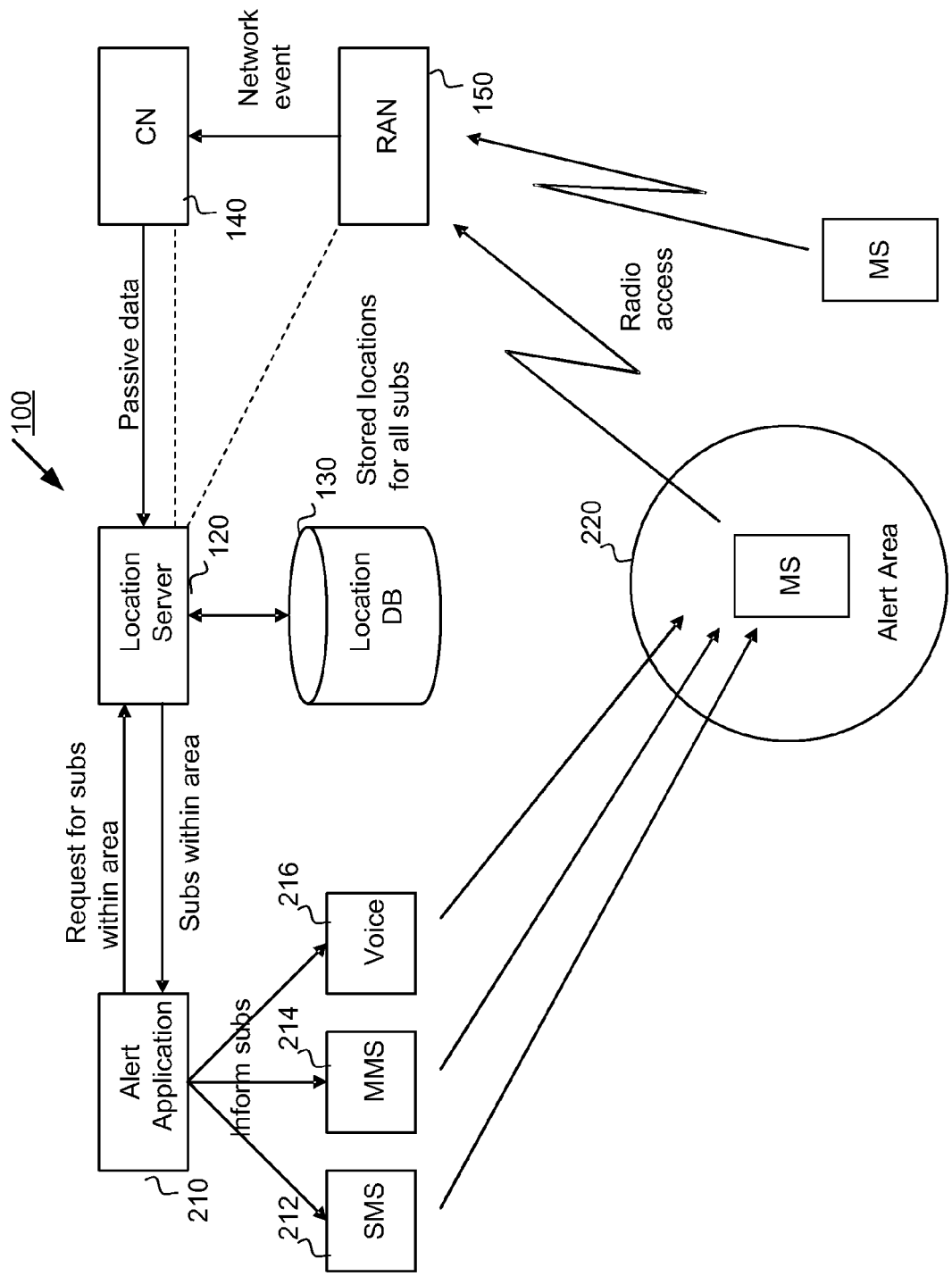
FIG. 2 is a block diagram showing an architecture overview of an alert system according to the invention.

FIG. 2 is a block diagram showing an architecture overview of an alert system according to the invention.

An alert application 210 request the Location Server 120 for subscribers that are within an area 220 by using MLP. Notification/alert is sent to the subscribers by the application. Since the alert application and location server/location database may use different representation of the geographical area it is not required that the area requested from the alert application and the area identified by the location server/location database is strictly identical. The application notifies the subscriber according to the customers need via either SMS 212, MMS 214, Voice 216 or by other methods.

The Location Server is responsible for an initial searching in the DB for all subscribers that are located in the alert area 220. It is also responsible for updating the DB with subscriber locations received from other nodes in the mobile network. The quality of the locations in the DB is dependent of the update frequency. The Location Server is also responsible for the optimized signaling flow described below.

The CN 140 sends passive data to the Location Server when the MS is in contact with the mobile net 100. Examples of this are network events such as subscriber sending SMS, making a call, location area update and periodic location update. The passive data include MS id and location information.

The solution to the problem is to reconfigure the CN and RAN to just send the information when it is needed, and also extract the location information as quickly as possible for the mobile network.

Figure 3:
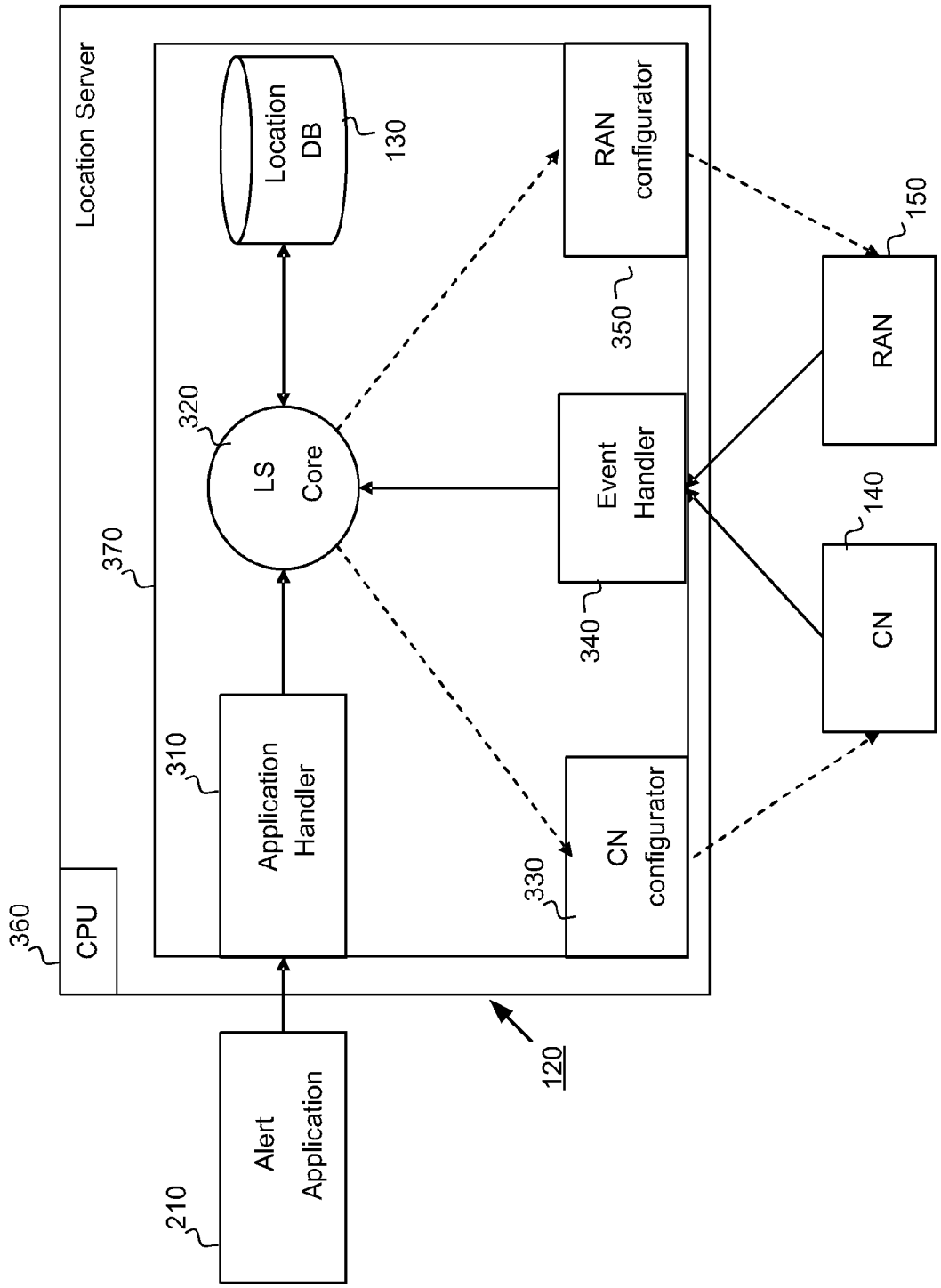
FIG. 3 is a block diagram showing a Location Server according to the invention.

FIG. 3 is a block diagram showing a Location Server 120 according to the invention having a processor 360 and a memory 370 having instructions accessible from the memory and processable by said processor.

The Location server contains several functional blocks with different responsibilities.

An Application Handler 310 is responsible for all communication with the Alert Application 210. It performs syntax control, decoding, authentication and authorization.

A Location Server LS Core 320 is the message mediator, and correlates all signaling toward a Core Network CN 140 and RAN 150.

The DB 130 is the location data storage for all subscribers as well as a specification of the served geographical area such as geographical information about cell structure.

A CN configurator 330 communicates with CN to switch on/off the passive data flow.

An Event Handler 340 receives passive data events from the core network 140 and the radio access network 150. The most important event is the Periodic Location Update PLU event that is a periodic registration event that occurs regularly according to a setting in the RAN. The PLU time can vary between several hours and part of an hour. Examples of other events are: Voice calls, SMS, Normal Location updates, IMSI/GPRS attach/detach, IMSI attach/detach and SS.

A RAN configurator 350 communicates with the RAN to reconfigure the PLU timer. LS 320 starts with requesting the PLU timer from the RAN 150 to make it possible to revert to the original value when the supervision period has passed. The LS sets a new very low PLU value, which is used until all locations have been reported to the LS (typically less than 10 minutes). The LS send a new request to RAN that sets the PLU timer to the original value.

Figure 4A:
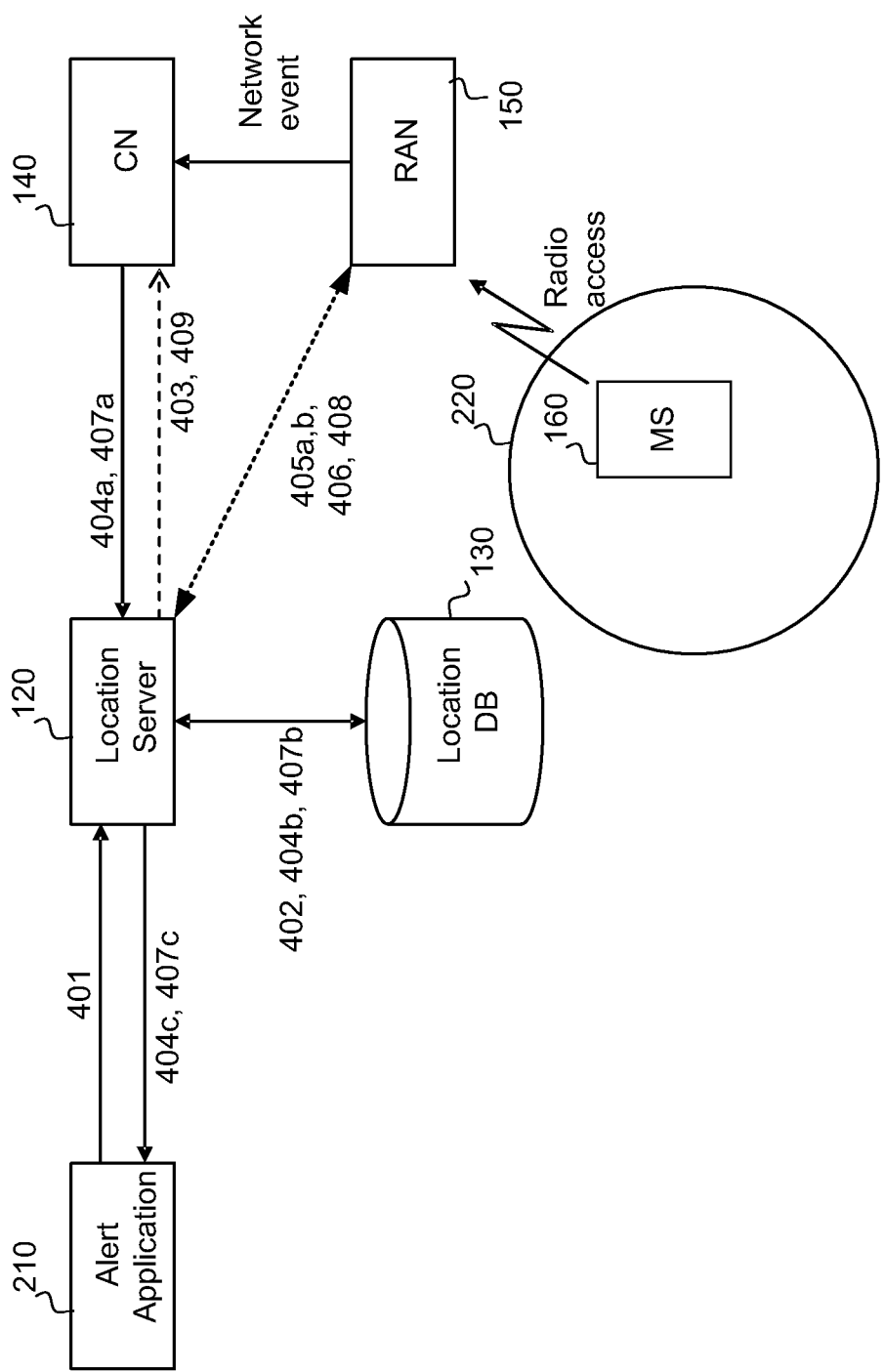
FIG. 4a is a block diagram showing a Location Server, and signals between other network elements of the alert system.

FIG. 4a is a block diagram showing the Location Server, and signals between other network elements of the alert system.

The passive data flow is put on hold until there is an area to supervise. When the Alert Application 210 wants find all subscribers in a specific area, then the passive data flow is enabled and the Location Server starts to collect subscriber locations.

In message 401 the LS receives request from the alert Application, including the alert area.

In message 402 LS determines which cell(s) that belongs to the alert area.

In message 403 LS send a start request to the CN that serves the particular cells. The start request can, as an option, specify only cells within the alert area 220 to be monitored.

In message 404a the start request will make the CN to start sending passive data for the subscribers to the Location Server.

In message 404b the subscriber locations are stored in the database.

In message 404c the subscribers that are within the alert area are sent to the alert application, including subscriber id, location and quality of provided data (age). It may also include information on when accurate data may be provided.

In messages 405a,b the LS fetch periodic location update (PLU) time from RAN for the particular cell(s). The PLU time is in order of hours.

In message 406 the LS configure a new, low, PLU time in the selected cells via the RAN. The value is in order of minutes.

In message 407*a* the LS receive passive data for all subscribers located in the selected cells within a couple of minutes.

In message 407*b* the subscriber locations are stored in the database.

In message 407*c* the subscribers that are within the alert area are sent to the alert application, including subscriber id, location and time. This is done until all subscribers have been located.

In message 408 the LS configure the original FLU value in the selected cells.

In message 409 the LS send a stop request to the CN to stop sending passive data.

The passive data in message 404*a* and message 407*a* is primarily generated by the PLU event received from RAN. During the time the cells are supervised there might also occur other events (for example; SMS is sent, IMSI attach, call is made, IMSI detach . . . ). The existences of these events are dependent on the implementation, but the benefits of having them are small.

Figure 4B:
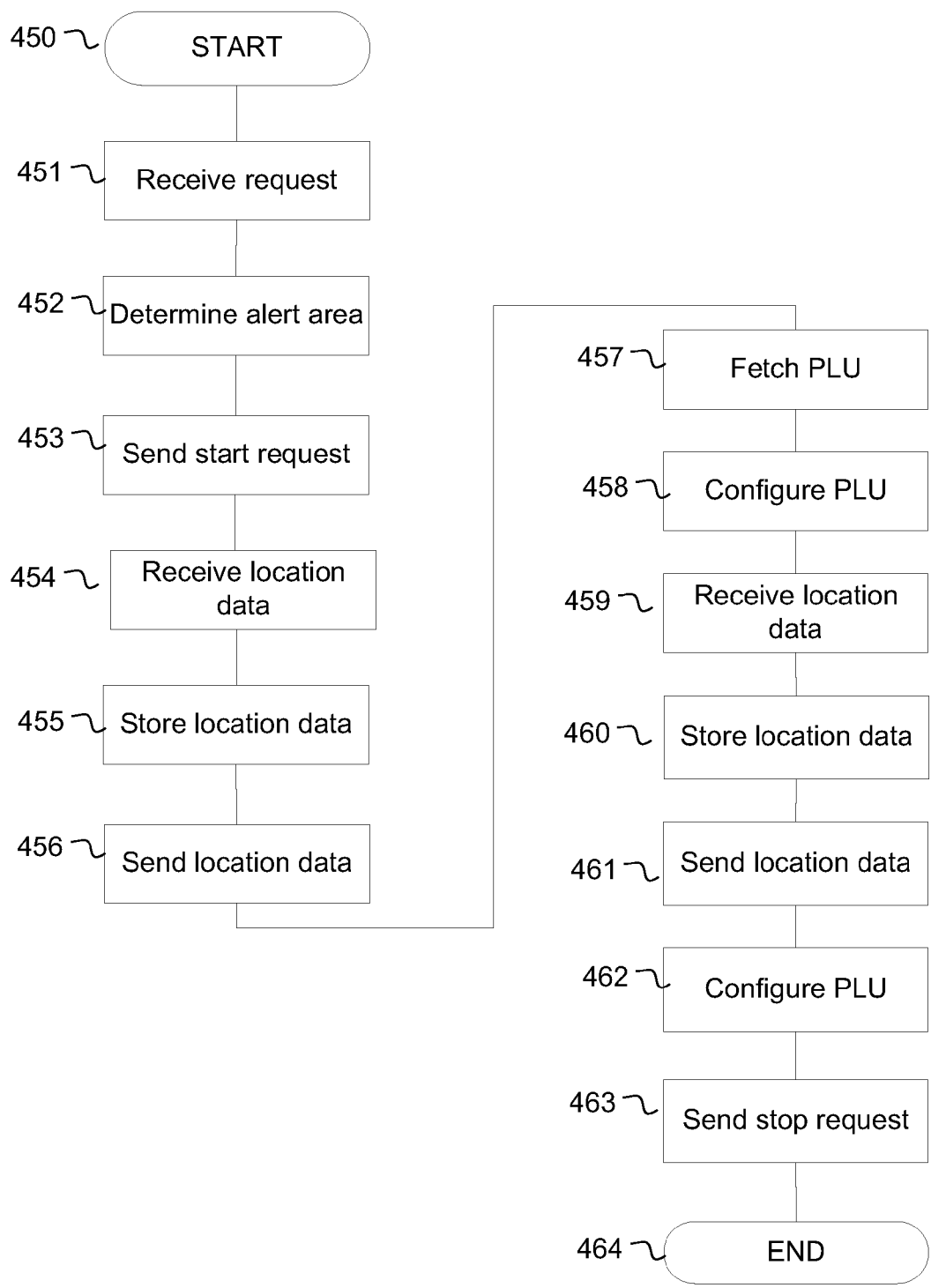

FIG. 4*b* is a flow chart showing the method of the Location Server in FIG. 4*a*.

The method starts in step 450.

In step 451 the LS receives request from the alert Application, including the alert area.

In step 452 LS determines which cell(s) that belongs to the alert area.

In step 453 LS send a start request to the CN that serves the particular cells. The start request can, as an option, specify only cells within the alert area 220 to be monitored.

The start request 453 will make the CN to start sending passive data for the subscribers to the Location Server which are received in step 454.

In step 455 the subscriber locations are stored in the database.

In step 456 the subscribers that are within the alert area are sent to the alert application, including subscriber id, location and quality of provided data (age). It may also include information on when accurate data may be provided.

In step 457 the LS fetch periodic location update (PLU) time from RAN for the particular cell(s). The PLU time is in order of hours.

In step 458 the LS configure a new, low, PLU time in the selected cells via the RAN. The value is in order of minutes.

In step 459 the LS receive passive data for all subscribers located in the selected cells within a couple of minutes.

In step 460 the subscriber locations are stored in the database.

In step 461 the subscribers that are within the alert area are sent to the alert application, including subscriber id, location and time. This is done until all subscribers have been located.

In step 462 the LS configure the original PLU value in the selected cells.

In step 463 the LS send a stop request to the CN to stop sending passive data.

The passive data in step 454 and step 459 is primarily generated by the PLU event received from RAN. During the time the cells are supervised there might also occur other events (for example; SMS is sent, IMSI attach, call is made, IMSI detach . . . ). The existences of these events are dependent on the implementation, but the benefits of having them are small.

The method ends in step 464.

Figure 5A:
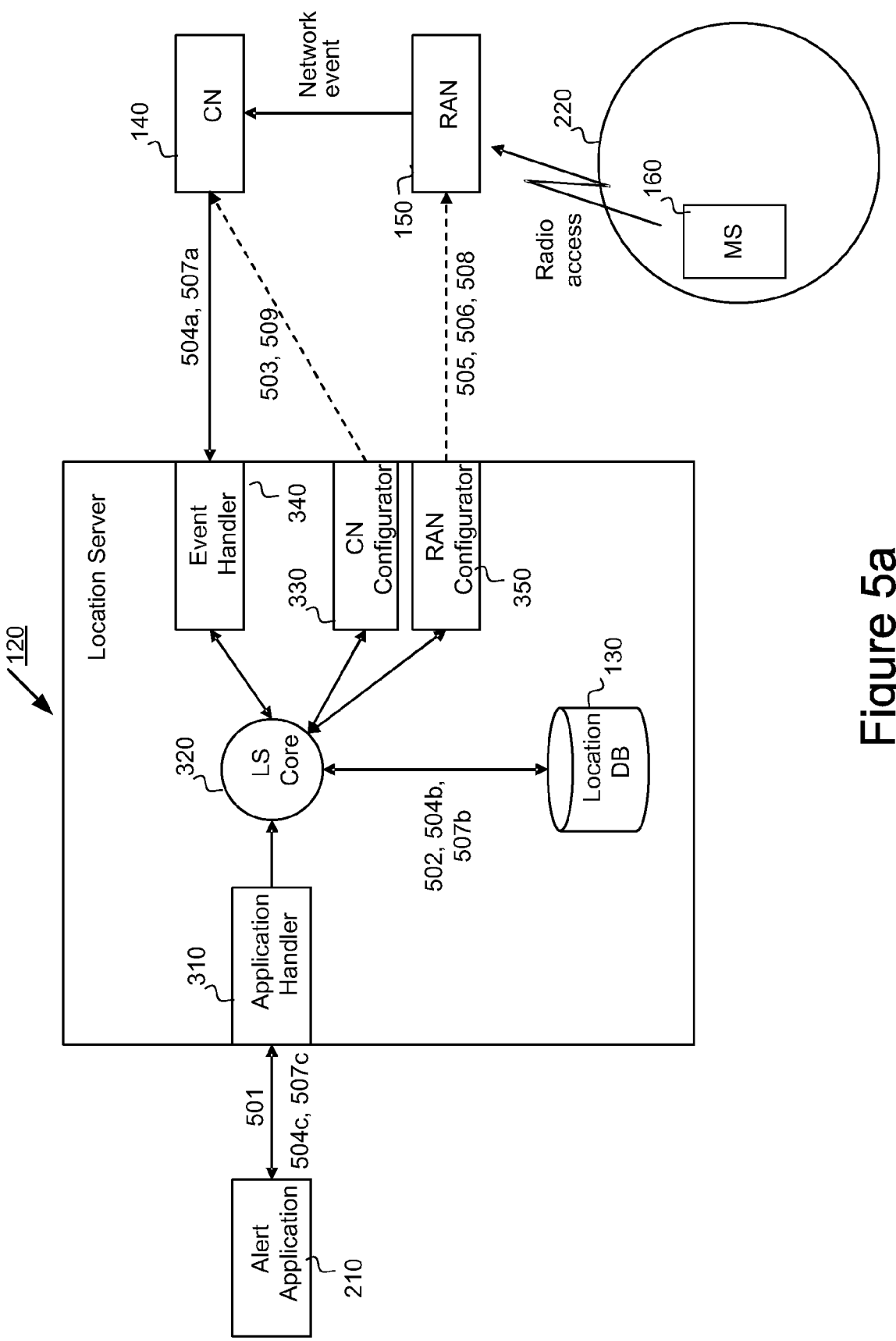
FIG. 5a is a block diagram showing an embodiment of the Location Server in FIG. 4 in more detail.

FIG. 5*a* is a block diagram showing an embodiment of the Location Server 120 of FIG. 4 in more detail.

The passive data flow is put on hold until there is an area to supervise. When the Alert Application 210 wants to find all subscribers in a specific area, then the passive data flow is enabled and the Location Server starts to collect subscriber locations.

In message 501 the Application Handler 310 receives a request from Alert Application, including alert area. The Application Handler decodes the message, authenticate and check authorization of the Alert Application to verify that the request is allowed. The request is handed over to LS Core 320 if the request is valid and authorized.

In messages 502 the LS Core determines which cell(s) that belongs to the alert area, by searching the Location DB 130.

In message 503 the LS Core informs CN Configurator 330 to send a start request to the CN 360 that serves the particular cells.

The start request will make the CN to start sending passive data for the subscribers to the Location Server which are received in messages 504*a*. The Event Handler 340 in the LS is responsible for receiving the network events/passive location data from the CN. The Event handler forwards the data to LS Core.

In message 504*b* the LS Core forward the location data to the database and translate the location data to a location estimate (latitude/longitude).

In message 504*c* the subscriber (i.e. identifier and subscriber data) that are within the alert area are sent by LS Core to the Application Handler, which forwards the data to the Alert Application. The data includes subscriber id, location estimate and quality of provided data (age). It may also include information on when accurate data may be provided.

In message 505 the LS Core requests RAN Configurator 350 to fetch periodic location update (PLU) time from RAN for the particular cell(s). The PLU time is normally in order of hours.

In message 506 the LS Core requests RAN Configurator to configure a new, lower, PLU time in the selected cells via the RAN. The value is normally in the order of minutes.

Within a couple of minutes (due to the new PLU time) passive data for all subscribers within the defined cells have been sent to the Event Handler. In message 507*a*, after having received the passive data, the Event Handler forwards the event data to LS Core.

In message 507*b* the LS Core forwards the location data to the Location DB and translates the location data to a location estimate (latitude/longitude).

In message 507*c* the subscribers data that are within the alert area are sent by LS Core to the Application Handler 310, which forwards the data to the Alert Application. The data includes subscriber id, location estimate and quality of provided data (age). It may also include information on when accurate data may be provided.

In message 508 the LS Core requests RAN Configurator to reconfigure the PLU value to the original value in the selected cells.

In message 509 the LS Core request CN Configurator to send a stop request to the CN. The stop request makes the CN stop sending passive data.

The passive data in message 504*a* and in message 507*a* is primarily generated by the PLU event received from RAN. During the time the cells are supervised there might also occur other events (for example; SMS is sent, IMSI attach, call is made, IMSI detach . . . ). The existences of these events are dependent on the implementation, but the benefits of having them are small.

Figure 5B:
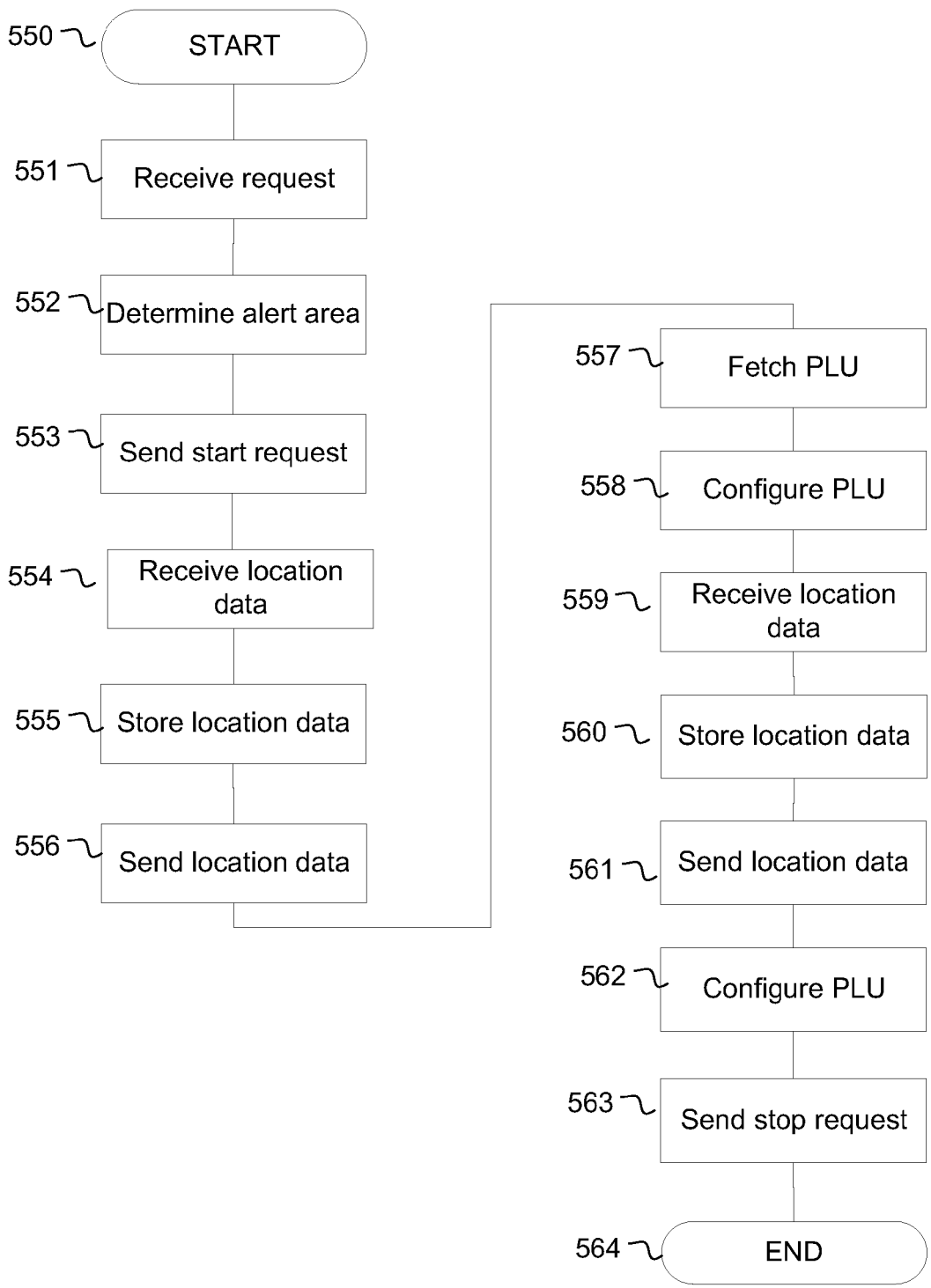

FIG. 5*b* is a flow chart showing the method of the Location Server in FIG. 5*a*.

The method starts in step 550.

In step 551 the Application Handler 310 receives a request from Alert Application, including alert area. The Application Handler decodes the message, authenticate and check authorization of the Alert Application to verify that the request is allowed. The request is handed over to LS Core 320 if the request is valid and authorized.

In step 552 the LS Core determines which cell(s) that belongs to the alert area, by searching the Location DB 130.

In step 553 the LS Core informs CN Configurator 330 to send a start request to the CN 360 that serves the particular cells.

In step 554 the LS receives passive data for the subscribers from the CN. The Event Handler 340 in the LS is responsible for receiving the network events/passive location data from the CN. The Event handler forwards the data to LS Core.

In step 555 the LS Core forward the location data to the database and translate the location data to a location estimate (latitude/longitude).

In step 556 the subscriber (i.e. identifier and subscriber data) that are within the alert area are sent by LS Core to the Application Handler, which forwards the data to the Alert Application. The data includes subscriber id, location estimate and quality of provided data (age). It may also include information on when accurate data may be provided.

In step 557 the LS Core requests RAN Configurator 350 to fetch periodic location update (PLU) time from RAN for the particular cell(s). The PLU time is normally in order of hours.

In step 558 the LS Core requests RAN Configurator to configure a new, lower, PLU time in the selected cells via the RAN. The value is normally in the order of minutes.

Within a couple of minutes (due to the new PLU time) passive data for all subscribers within the defined cells have been received by the Event Handler. In step 559, after having received the passive data, the Event Handler forwards the event data to LS Core.

In step 560 the LS Core forwards the location data to the Location DB and translates the location data to a location estimate (latitude/longitude).

In step 561 the subscribers data that are within the alert area are sent by LS Core to the Application Handler 310, which forwards the data to the Alert Application. The data includes subscriber id, location estimate and quality of provided data (age). It may also include information on when accurate data may be provided.

In step 562 the LS Core requests RAN Configurator to reconfigure the PLU value to the original value in the selected cells.

In step 563 the LS Core request CN Configurator to send a stop request to the CN. The stop request makes the CN stop sending passive data.

The method ends in step 564.

Figure 6:
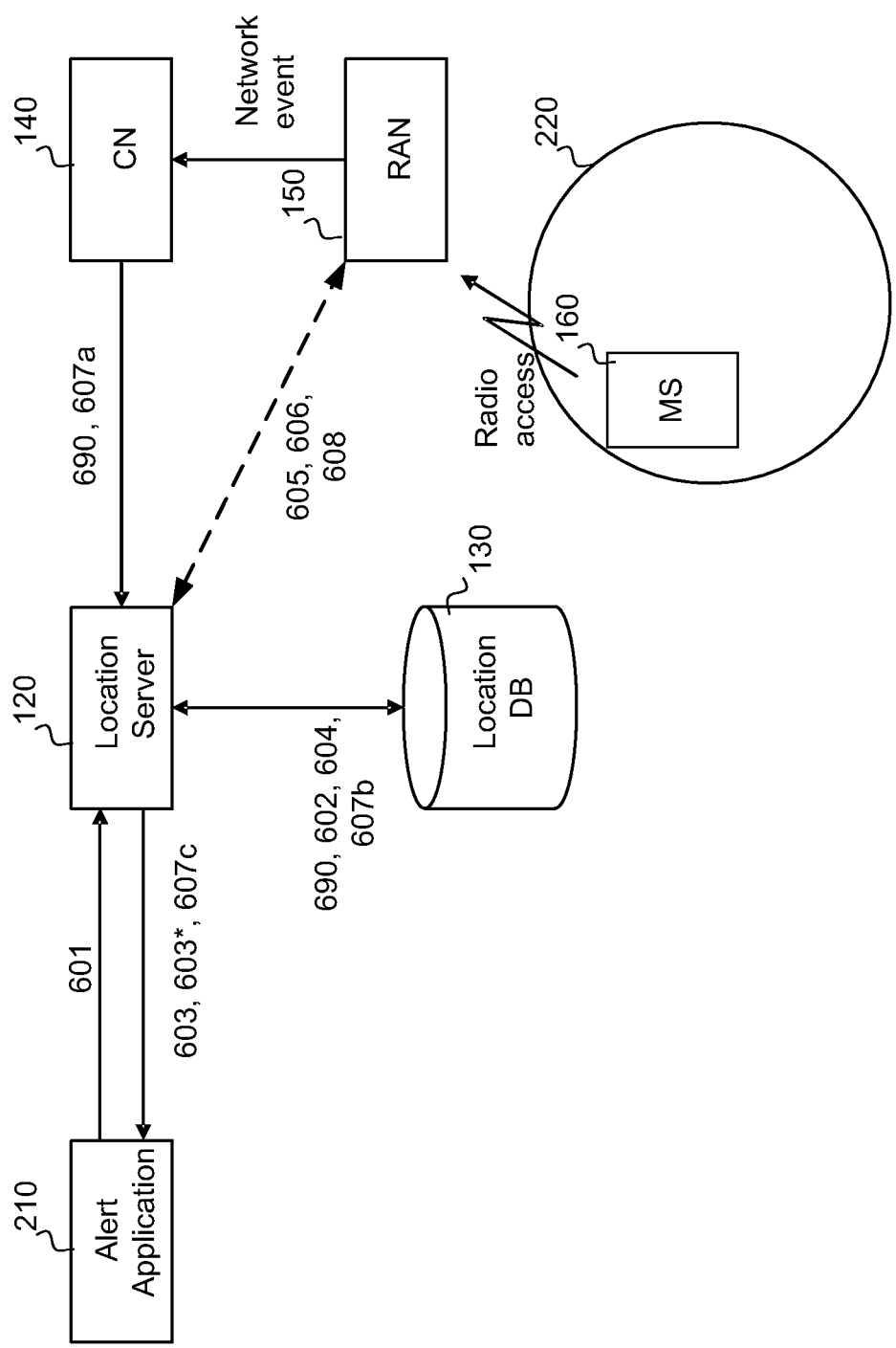
FIG. 6 is a signal diagram showing another embodiment of a Location Server according to the invention.

FIG. 6 is a signal diagram showing another embodiment of a Location Server according to the invention.

Subscribers that subscribe to ST services will have updated positions stored in the location database DB every time there is radio communication between the terminal and the PLMN (such as SMS sending, making call, attach to network, LA update ... ). This means that ST enabled subscribers will have high quality on the positioning data, and the consequence is that those subscribers load the network more than other users. The load is however quite low as long as only a part of the subscriber base is using ST.

An alternative to get all passive data events for the subscribers is to select only one or a few of the events. One event suitable for this is the Periodic Location Update event. This event comes regularly, for example once every hour. That would mean that the average age of location would be 30 minutes. The shorter interval that is used, the more is the CN, LS and transmission network loaded. This alternative (with a reasonable high PLU time) is however very good to combine with the optimized solution, since this alternative provides an updated location database which facilitates a fast response to the application.

In this embodiment the passive data flow active for ST enabled subscribers includes all event types. All non-ST enabled subscribers will only get network events for the PLU passive data event. When the Alert Application wants to find all subscribers in a specific area, then the passive data flow is increased for all subscribers in the relevant cells, by decreasing the PLU time.

In messages 690 passive data for all subscribers are continuously sent to the Location Server from the CN. The LS store the data in the database. The subscriber location data is normally updated with an interval of 1-8 hour.

In message 601 the LS receive a request from alert Application, including alert area.

In messages 602 the LS performs a search in the database to find which subscribers that have a location that overlaps with the alert area.

In message 603 a response including MSISDN, location and age of the location is sent to the alert application.

In messages 603* the LS starts at this point to forward subscriber locations for the subscribers within the alert area to the alert application.

In messages 604 the LS determines which cell(s) that belongs to the requested area In messages 605 the LS fetch current periodic location update (PLU) time from RAN for the particular cell(s). The PLU time is in order of hours.

In message 606 the LS configure a new, low, PLU time in the selected cells via the RAN. The value is in order of minutes.

In message 607*a* the LS receive passive data for all subscribers located in the selected cells within a couple of minutes.

In message 607*b* the subscriber locations are stored in the database.

In message 607*c* the subscribers that are within the alert area are sent to the alert application, including subscriber id, location and time. This is done until all subscribers have been located.

Figure 7A:
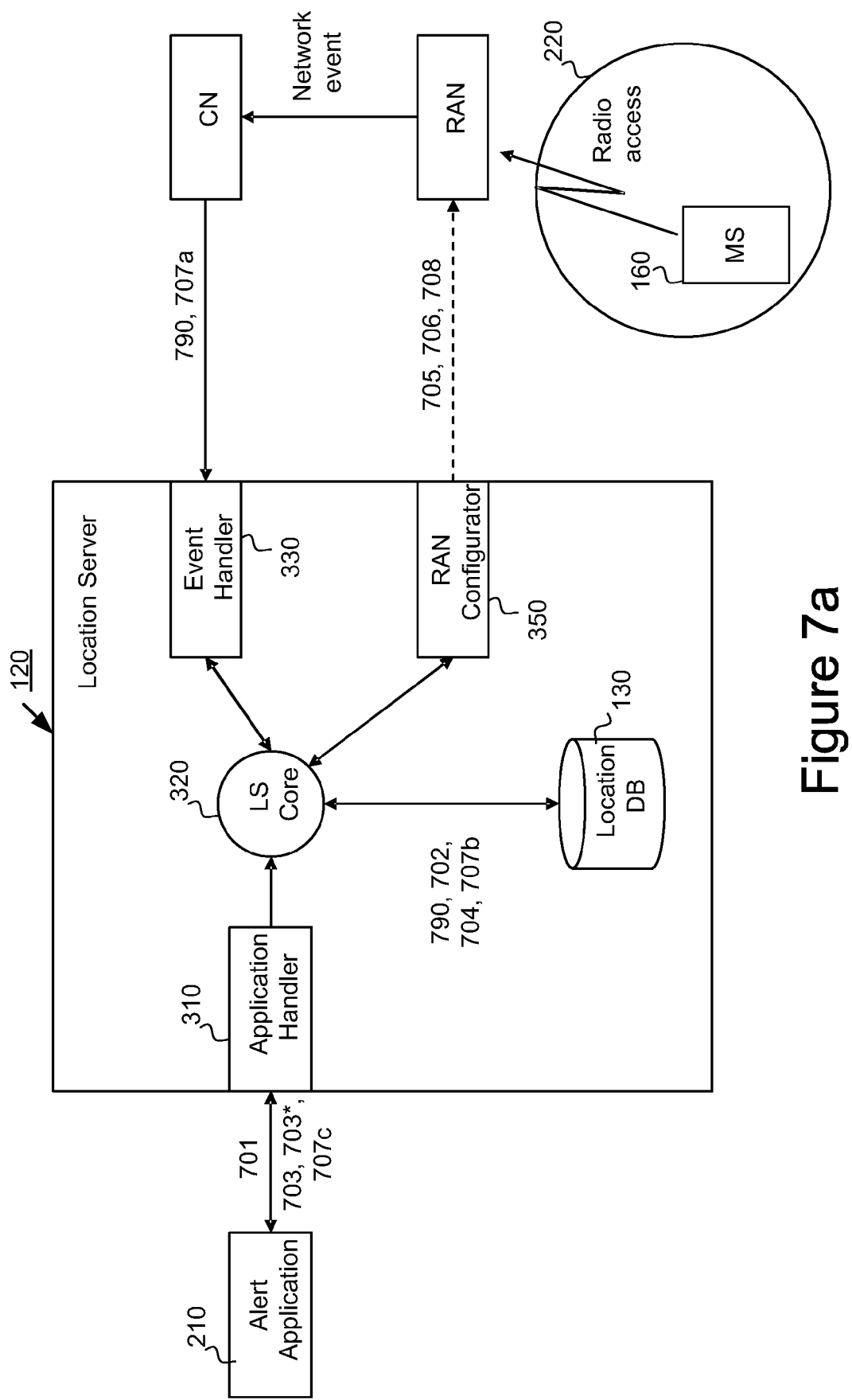
FIG. 7a is a block diagram showing an embodiment of the Location Server in FIG. 4 in more detail.

In message 608 the LS configure the original PLU value in the selected cells FIG. 7*a* is a block diagram showing an embodiment of the Location Server in FIG. 4 in more detail.

In this embodiment the passive data flow active for ST enabled subscribers includes all event types. All non-ST enabled subscribers will only get network events for the PLU passive data event. When the Alert Application wants to find all subscribers in a specific area, then the passive data flow is increased for all subscribers in the relevant cells, by decreasing the PLU time.

In messages 790 passive data for all subscribers are continuously sent to the Event Handler in the LS from CN. The Event Handler forwards the data to the Location DB via LS Core.

In message 701 the Application Handler receives request from Alert Application, including alert area. The Application Handler decodes the message, authenticates and checks authorization of the Alert Application to verify that the request is allowed. The request is handed over to LS Core if the request is valid and authorized.

In message 702 the LS Core requests the database for all subscribers currently with a location estimate that is within or overlapping with the alert area. The response is forwarded to the Application Handler.

In message 703 the Application Handler responds to the Alert Application with a response including MSISDN, location and age of the location for all subscribers matching the alert area.

In message 703\* the LS Core will at this point start to check all incoming passive data, to see if the subscriber location is within the alert area. The subscribers and their respective locations that are within the alert area are forwarded to the Application Handler that in turn forwards the data to the Alert Application.

In message 704 the LS Core determines by interrogating the Location DB which cell(s) that belongs to the requested area In message 705 the LS Core requests RAN Configurator to fetch periodic location update (PLU) time from RAN for the particular cell(s). The PLU time is in order of hours.

In message 706 the LS Core requests RAN Configurator to configure a new, low, PLU time in the selected cells via the RAN. The value is in order of minutes.

Within a couple of minutes (due to changed PLU time) passive data for all subscribers within the defined cells have been sent to the Event Handler. After having received the passive data the Event Handler forwards the data to LS Core in message 707a.

In message 707b the LS Core forward the location data to the Location DB and translates the location data to a location estimate (latitude/longitude).

In message 707c the subscribers that are within the alert area are sent by LS Core to the Application Handler, which forwards the data to the Alert Application. The data includes subscriber id, location estimate and quality of provided data (age).

In message 708 the LS Core requests RAN Configurator to reconfigure the PLU value to the original value in the selected cells.

Figure 7B:
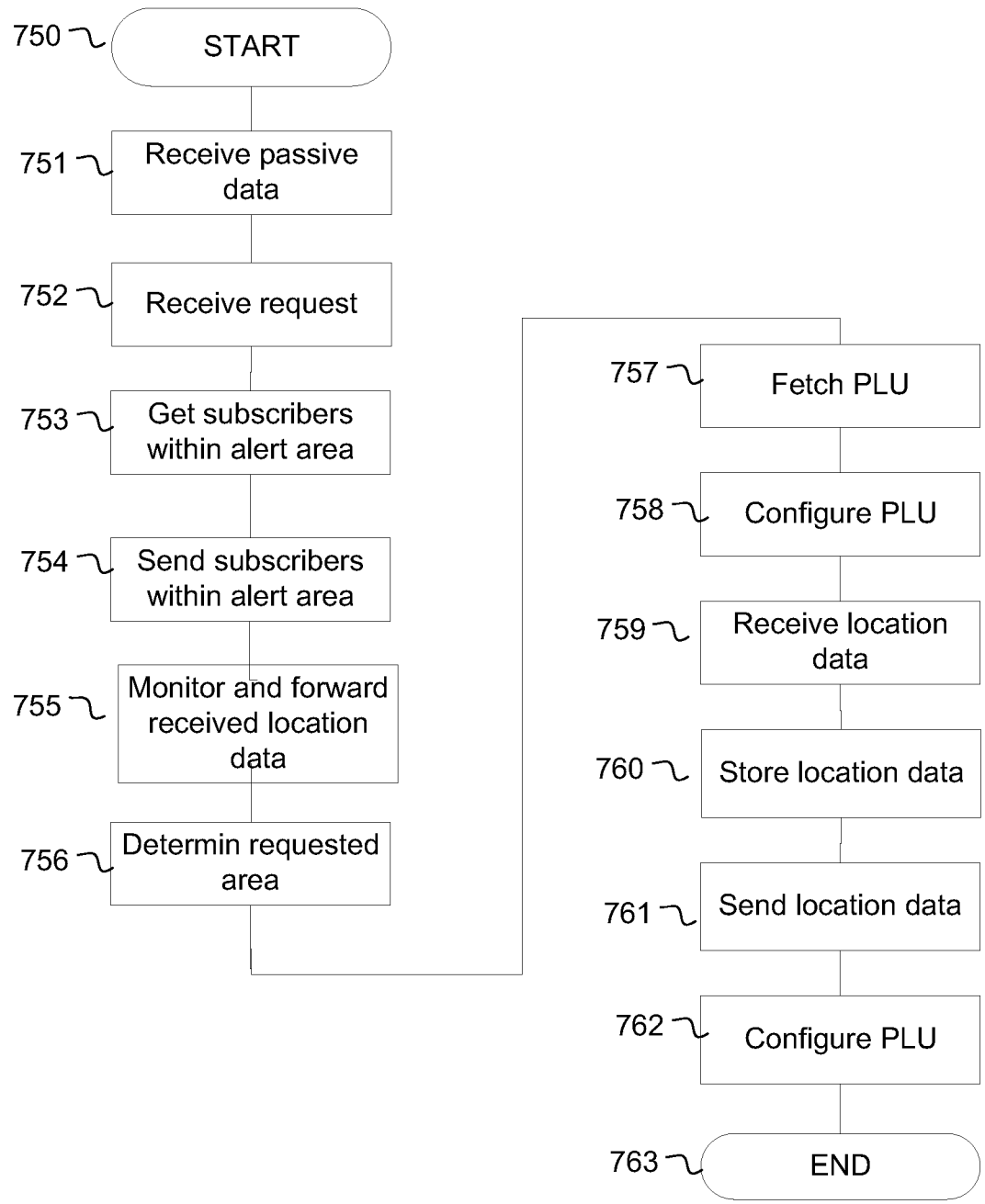
FIG. 7b is a flow chart showing the method of the Location Server if FIG. 7a in more detail.

FIG. 7b is a flow chart showing the method of the Location Server if FIG. 7a in more detail.

The method starts in step 750.

In steps 751 passive data for all subscribers are continuously sent to the Event Handler in the LS from CN.

The Event Handler forwards the data to the Location DB via LS Core.

In step 752 the Application Handler receives request from Alert Application, including alert area. The Application Handler decodes the message, authenticates and checks authorization of the Alert Application to verify that the request is allowed. The request is handed over to LS Core if the request is valid and authorized.

In step 753 the LS Core requests the database for all subscribers currently with a location estimate that is within or overlapping with the alert area. The response is forwarded to the Application Handler.

In step 754 the Application Handler responds to the Alert Application with a response including MSISDN, location and age of the location for all subscribers matching the alert area.

In step 755 the LS Core will at this point start to check all incoming passive data, to see if the subscriber location is within the alert area. The subscribers and their respective locations that are within the alert area are forwarded to the Application Handler that in turn forwards the data to the Alert Application.

In step 756 the LS Core determines by interrogating the Location DB which cell(s) that belongs to the requested area.

In step 757 the LS Core requests RAN Configurator to fetch periodic location update (PLU) time from RAN for the particular cell(s). The PLU time is in order of hours.

In step 758 the LS Core requests RAN Configurator to configure a new, low, PLU time in the selected cells via the RAN. The value is in order of minutes.

Within a couple of minutes (due to changed PLU time) passive data for all subscribers within the defined cells have been sent to the Event Handler. After having received the passive data the Event Handler forwards the data to LS Core in step 759.

In step 760 the LS Core forward the location data to the Location DB and translates the location data to a location estimate (latitude/longitude).

In step 761 the subscribers that are within the alert area are sent by LS Core to the Application Handler, which forwards the data to the Alert Application. The data includes subscriber id, location estimate and quality of provided data (age).

In step 762 the LS Core requests RAN Configurator to reconfigure the PLU value to the original value in the selected cells.

The method ends in step 763.

An advantage of the invention is that it is possible to locate subscribers within a particular area quickly and with low load on the Core Network CN (E.G. MSC, SGSN, Etc.), Location Server and the transmission network.

The system is using on spatial triggers, with all advantages that ST have in terms of quality of service, with updated subscriber locations and improve the age of location by modifying configuration settings in the RAN at runtime.

The problem with high network load is solved by in runtime switching off the CN functionality when it is not needed. Another important improvement is that the high update rate is only used in the needed cells and not in the complete network.

Most operators want to have fresh positions in the location database and with the invention the average age of location is significantly decreased.

The steady stream of location data from the CN when using spatial triggers means also that the load in the CN will be high (i.e. the capacity drops). With the invention the load in CN is reduced to a slight Central Processing Unit CPU increase during a couple of minutes.

Another advantage is that the amount of Gateway Mobile Location Center GMLC hardware needed to be able to handle the constant high traffic load from the CN during continuous spatial triggering is avoided.

The invention claimed is:

1. A method for mobile subscriber alert notification comprising in a location server performing the steps of:
    receiving from an alert application a request for identity of subscribers within an alert area;
    receiving from at least one network node subscriber location data;
    checking the subscriber location data and informing the alert application about subscribers located within the alert area;
    determining which cells belong to the alert area;
    after the steps of receiving the request for subscribers within the alert area and determining which cells belong to the alert area, the further step of sending a request to at least one network node for cells belonging to the alert area; and
    wherein the request comprises a request to modify a radio access network periodic location update configuration setting for when a mobile station contacts a mobile net via cells managed by the radio access network for periodic registration of location information.

2. The method according to claim 1 wherein said request is sent only for network nodes that serves said cells.

3. The method according to claim 1 wherein the request for modifying the configuration in the network nodes comprises a start request for transmission of location data.

4. The method according to claim 1 wherein the step of receiving mobile station location data from at least one network node further comprises storing the mobile station location data in a location database.

5. The method according to claim 1 wherein the modified configuration comprises a Periodic Location Update parameter.

6. The method according to claim 5 wherein said Periodic Location Update parameter is changed from a lower frequency to a higher frequency.

7. The method according to claim 5 comprising the step of resetting the configuration.

8. The method according to claim 7 wherein the step of resetting comprises sending a stop request to the network nodes for stop of location data transmission when mobile stations have been sufficiently located.

9. The method according to claim 1 wherein the step of informing the alert application further comprises informing when more accurate information about mobile stations located within the alert area can be provided.

10. The method according to claim 1 wherein the location data is passive location data.

11. The method according to claim 1 wherein the passive location data is a location data generated in a network element due to any of the events: sending an SMS, making a call, location area update or periodic location update.

12. An apparatus for mobile subscriber alert notification having a processor and a memory having instructions accessible from the memory and processable by said processor, comprising:
   an application handler for receiving from an alert application a request for identity of subscribers within an alert area;
   an event handler for receiving from at least one network node subscriber location data;
   a message mediator for checking the subscriber location data and informing the alert application about subscribers located within the alert area;
   the message mediator further configured for determining which cells belong to the alert area;
   a network configurator for sending a request to at least one network node for cells belonging to the alert area;
   wherein the request from the network configurator comprises a request to modify a radio access network periodic location update setting for when a mobile station contacts a mobile net via cells managed by the radio access network for periodic registration of location information.

13. The apparatus according to claim 12 wherein the request from the network configurator is sent only for network nodes that serves said cells.

14. The apparatus according to claim 12 wherein the network configurator instructs the core network to start transmission of location data.

15. The apparatus according to claim 12 comprising a location database for storing at least one of the mobile station location data and a specification of the served geographical area.

16. The apparatus according to claim 12 wherein the network configurator modifies a Periodic Location Update parameter of the configuration.

17. The apparatus according to claim 16 wherein said network configurator modifies the Periodic Location Update parameter from a lower frequency to a higher frequency.

18. The apparatus according to claim 16 wherein the network configurators reset the configuration.

19. The apparatus according to claim 18 wherein the network configurators reset by sending a stop request to the network nodes for stop of location data transmission when mobile stations have been sufficiently located.

20. The apparatus according to claim 12 wherein the application handler informs the alert application when more accurate information about mobile stations located within the alert area can be provided.

21. The apparatus according to claim 12 wherein the location data is passive location data.

22. The apparatus according to claim 12 wherein the passive location data is a location data generated in a network element due to any of the events: sending an SMS, making a call, location area update or periodic location update.

* * * * *